(12) United States Patent
Mitchell et al.

(10) Patent No.: US 9,909,480 B2
(45) Date of Patent: Mar. 6, 2018

(54) APPARATUS, METHOD, AND SYSTEM FOR DIAGNOSING REDUCTANT DEPOSITS IN AN EXHAUST AFTERTREATMENT SYSTEM

(71) Applicant: Cummins IP, Inc., Columbus, IN (US)

(72) Inventors: Douglas A. Mitchell, Indianapolis, IN (US); Andrew W. Osburn, Nashville, IN (US); Jason Drost, Lake Mills, WI (US); Jim F. Burke, Columbus, IN (US); Joseph M. Brault, Columbus, IN (US)

(73) Assignee: CUMMINS IP, INC., Columbus, IN (US)

( * ) Notice: Subject to any disclaimer, the term of this patent is extended or adjusted under 35 U.S.C. 154(b) by 106 days.

(21) Appl. No.: 14/981,265

(22) Filed: Dec. 28, 2015

(65) Prior Publication Data

US 2016/0131010 A1    May 12, 2016

Related U.S. Application Data

(63) Continuation of application No. 13/783,025, filed on Mar. 1, 2013, now Pat. No. 9,261,006.

(51) Int. Cl.
*F01N 9/00*        (2006.01)
*F01N 11/00*       (2006.01)
(Continued)

(52) U.S. Cl.
CPC ............. *F01N 9/00* (2013.01); *F01N 3/2066* (2013.01); *F01N 11/002* (2013.01);
(Continued)

(58) Field of Classification Search
CPC ........ F01N 3/2066; F01N 9/00; F01N 11/002; F01N 2550/05; F01N 2560/06;
(Continued)

(56) References Cited

U.S. PATENT DOCUMENTS 8,101,145 B1    1/2012  Norton et al.
2006/0236681 A1  10/2006  Masuda et al.
(Continued)

FOREIGN PATENT DOCUMENTS

EP    1 331 373 A2    7/2003
GB    2 448 993       11/2008
(Continued)

OTHER PUBLICATIONS

Extended European Search Report for European Patent Application No. EP 14156645, dated Jul. 14, 2014, 7 pages.

*Primary Examiner* — Audrey K Bradley
(74) *Attorney, Agent, or Firm* — Foley & Lardner LLP

(57) ABSTRACT

An exhaust gas treatment system for an internal combustion engine may have a reductant delivery system that delivers reductant to an exhaust stream in an exhaust aftertreatment system. A temperature sensor may be positioned in or near the flow of reductant and exhaust to measure the temperature of the reductant and exhaust. A change in temperature over time, such as an increase, decrease, or change in variation amplitude, may indicate the presence of a reductant deposit in the system. Detection of the deposit may initiate a regeneration cycle in which the operating characteristics of the system change to eliminate the reductant deposit to prevent it from hindering the performance of the exhaust aftertreatment system.

13 Claims, 5 Drawing Sheets

(51) Int. Cl.
*F01N 3/20* (2006.01)
*F02D 41/02* (2006.01)

(52) U.S. Cl.
CPC ........ *F02D 41/027* (2013.01); *F01N 2550/05* (2013.01); *F01N 2560/06* (2013.01); *F01N 2610/02* (2013.01); *F01N 2610/03* (2013.01); *F01N 2610/148* (2013.01); *F01N 2900/1404* (2013.01); *Y02T 10/47* (2013.01)

(58) Field of Classification Search
CPC ............. F01N 2610/02; F01N 2610/03; F01N 2610/148; F01N 2900/1404; F02D 41/027; Y02T 10/47
See application file for complete search history.

(56) References Cited

U.S. PATENT DOCUMENTS

| | | |
|---|---|---|
| 2007/0163232 A1 | 7/2007 | Ueno |
| 2008/0271440 A1 | 11/2008 | Xu et al. |
| 2011/0036072 A1 | 2/2011 | Inoue |
| 2011/0314820 A1 | 12/2011 | Plougmann |
| 2013/0028792 A1 | 1/2013 | Yano et al. |
| 2013/0152545 A1 | 6/2013 | Chavannavar |

FOREIGN PATENT DOCUMENTS

| | | | | |
|---|---|---|---|---|
| WO | WO-2012/052799 | | 4/2012 | |
| WO | WO 2012052799 A1 | * | 4/2012 | ............. F01N 3/208 |

* cited by examiner

APPARATUS, METHOD, AND SYSTEM FOR DIAGNOSING REDUCTANT DEPOSITS IN AN EXHAUST AFTERTREATMENT SYSTEM

CROSS-REFERENCE TO RELATED PATENT APPLICATIONS

This application is a continuation of U.S. patent application Ser. No. 13/783,025, filed Mar. 1, 2013, and the contents of which are incorporated herein by reference in its entirety.

FIELD

This disclosure relates to internal combustion engines, and more particularly to diagnosing the operation of a reductant delivery system for treating exhaust gas in an exhaust gas aftertreatment system.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Consequently, the use of exhaust aftertreatment systems on engines to reduce emissions is increasing.

Generally, emission requirements vary according to engine type. Emission tests for compression-ignition (e.g., diesel) engines typically monitor the release of carbon monoxide (CO), unburned hydrocarbons (UHC), diesel particulate matter (PM) such as ash and soot, and nitrogen oxides ($NO_x$).

With regard to reducing $NO_x$ emissions, $NO_x$ reduction catalysts, including selective catalytic reduction (SCR) systems, are utilized to convert $NO_x$ (NO and $NO_2$ in some fraction) to $N_2$ and other compounds. SCR systems utilize a reductant, typically ammonia, to reduce the $NO_x$. Currently available SCR systems can produce high $NO_x$ conversion rates allowing the combustion technologies to focus on power and efficiency. However, currently available SCR systems also suffer from a few drawbacks.

SCR systems utilize a reductant delivery system to introduce a reductant, such as aqueous urea or diesel exhaust fluid, into the exhaust stream upstream of the SCR catalyst. The reductant may tend to form deposits over time within the exhaust aftertreatment system, such as on exhaust aftertreatment components (e.g., reductant dosers) and/or on the walls of exhaust conduits (e.g., reductant decomposition chambers). Such deposits can adversely affect the operation of the engine (e.g., by restricting the exhaust flow passageway) and the exhaust aftertreatment system (e.g., by impeding the catalytic reaction). If the deposit is not soon detected and remedied, the engine system may not function properly. For example, reductant deposits may negatively affect fuel consumption, $NO_x$ reduction efficiency, and other operating characteristics of an internal combustion engine.

SUMMARY

The subject matter of the present application has been developed in response to the present state of the art, and in particular, in response to the problems and needs in the art that have not yet been fully solved by currently available exhaust aftertreatment systems. Accordingly, the subject matter of the present application has been developed to provide apparatus, methods, and systems for diagnosing reductant deposit buildup that overcome at least some shortcomings of the prior art exhaust aftertreatment systems.

According to one embodiment, an apparatus for diagnosing existence of reductant deposits in an exhaust aftertreatment system may have a reductant delivery system that delivers reductant to exhaust gas produced by an internal combustion engine to provide a mixture of exhaust gas and reductant, and a control module that operates the reductant delivery system. The apparatus may further have a sampling module that samples a first temperature of the mixture of exhaust gas and reductant and samples a second temperature of the mixture of exhaust gas and reductant, a calculation module that calculates a temperature differential between the first and second temperatures, and a comparison module that compares the first pressure differential with a threshold temperature differential to determine whether a reductant deposit exists within the exhaust aftertreatment system.

Such an apparatus may further have a reporting module that reports a performance status indicating existence of a reductant deposit within the exhaust aftertreatment system.

Such an apparatus may further have a regeneration module that receives the performance status and, in response to receipt of the performance status, initiates a regeneration cycle of the exhaust aftertreatment system to at least partially remove the reductant deposit.

In such an apparatus, the sampling module may obtain the first and second temperatures from a temperature sensor positioned in a boss that extends from a decomposition chamber of the exhaust aftertreatment system, wherein the reductant delivery system delivers the reductant to the exhaust gas through the boss.

In such an apparatus, the sampling module may obtain the first and second temperatures from a temperature sensor positioned in or near the exhaust aftertreatment system. After sampling the first temperature, the sampling module may wait for a time increment sufficient for the reductant deposit to form or increase significantly in size after sampling the first temperature.

In such an apparatus, the threshold temperature differential may be a temperature rise from the first temperature to the second temperature. The comparison module may determine that the reductant deposit exists if the second temperature exceeds the first temperature by an amount greater than the temperature rise.

In such an apparatus, the threshold temperature differential may be a temperature drop from the first temperature to the second temperature. The comparison module may determine that the reductant deposit exists if the first temperature exceeds the second temperature by an amount greater than the temperature drop.

In such an apparatus, the threshold temperature differential may be a magnitude of temperature variation. The comparison module may determine that the reductant deposit exists if the absolute value of the difference between the first and second temperatures is greater than the magnitude of temperature variation.

In such an apparatus the sampling module may further takes a plurality of temperature samples to obtain at least one of the first and second temperatures. At least one of the first and second temperatures may be an average temperature of the plurality of temperature samples.

According to one method for diagnosing existence of a reductant deposit in an exhaust aftertreatment system, the exhaust aftertreatment system may deliver reductant to exhaust gas produced by an internal combustion engine to provide a mixture of exhaust gas and reductant. The method may include positioning a temperature sensor in or near the exhaust aftertreatment system, sampling a first temperature of the mixture of exhaust gas and reductant with the temperature sensor, and using the first temperature to make a comparison to determine whether a reductant deposit has formed in the exhaust aftertreatment system.

Such a method may further include reporting a performance status that the reductant deposit exists within the exhaust aftertreatment system, and initiating a regeneration cycle of the internal combustion engine to at least partially remove the reductant deposit in response to receipt of the performance status.

Such a method may further include waiting for a time increment sufficient for the reductant deposit to form or increase significantly in size after sampling the first temperature, sampling a second temperature of the mixture of exhaust gas and reductant with the temperature sensor after waiting for the time increment, and calculating a temperature differential between the first and second temperatures.

In such a method, the temperature sensor may be positioned in a boss that extends from a decomposition chamber of the exhaust aftertreatment system. Delivering reductant to the exhaust gas may include delivering the reductant through the boss.

In such a method, the threshold temperature differential may be a temperature rise from the first temperature to the second temperature. Comparing the temperature differential with the threshold temperature differential may include determining that the reductant deposit exists if the second temperature deposit exists by an amount greater than the temperature rise.

In such a method, the threshold temperature differential may be a temperature drop occurring from the first temperature to the second temperature. Comparing the temperature differential with the threshold temperature differential may include determining that the reductant deposit exists if first temperature exceeds the second temperature by an amount greater than the temperature drop.

In such a method, the threshold temperature may be a magnitude of temperature variation. Comparing the temperature differential with a threshold temperature differential may include determining that the reductant deposit exists if the absolute value of the difference between the first and second temperatures is greater than the magnitude of temperature variation.

In such a method, at least one of sampling the first temperature and sampling the second temperature may include taking a plurality of temperature samples. At least one of the first temperature and the second temperature may be an average temperature of the plurality of temperature samples.

An internal combustion engine system may have an internal combustion engine, an exhaust aftertreatment system in exhaust gas receiving communication with the internal combustion engine, a reductant delivery system in reductant supplying communication with exhaust gas in the exhaust aftertreatment system to provide a mixture of exhaust gas and reductant, a temperature sensor positioned to measure temperature of the mixture of exhaust gas and reductant, and an on-board diagnostic system that samples temperature data from the temperature sensor and uses the temperature data to determine whether a reductant deposit exists within the exhaust aftertreatment system.

In such an internal combustion engine system, sampling temperature data from the temperature sensor may include obtaining a first temperature and a second temperature from the temperature sensor. The on-board diagnostic may further calculate a temperature differential between the first and second temperatures to provide a first temperature differential, and may compare the first temperature differential with a threshold temperature differential to determine whether a reductant deposit has formed in the exhaust aftertreatment system.

In such an internal combustion engine system, the temperature sensor may be positioned in a boss that extends from a decomposition chamber of the exhaust aftertreatment system. The reductant delivery system may deliver the reductant to the exhaust gas through the boss.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
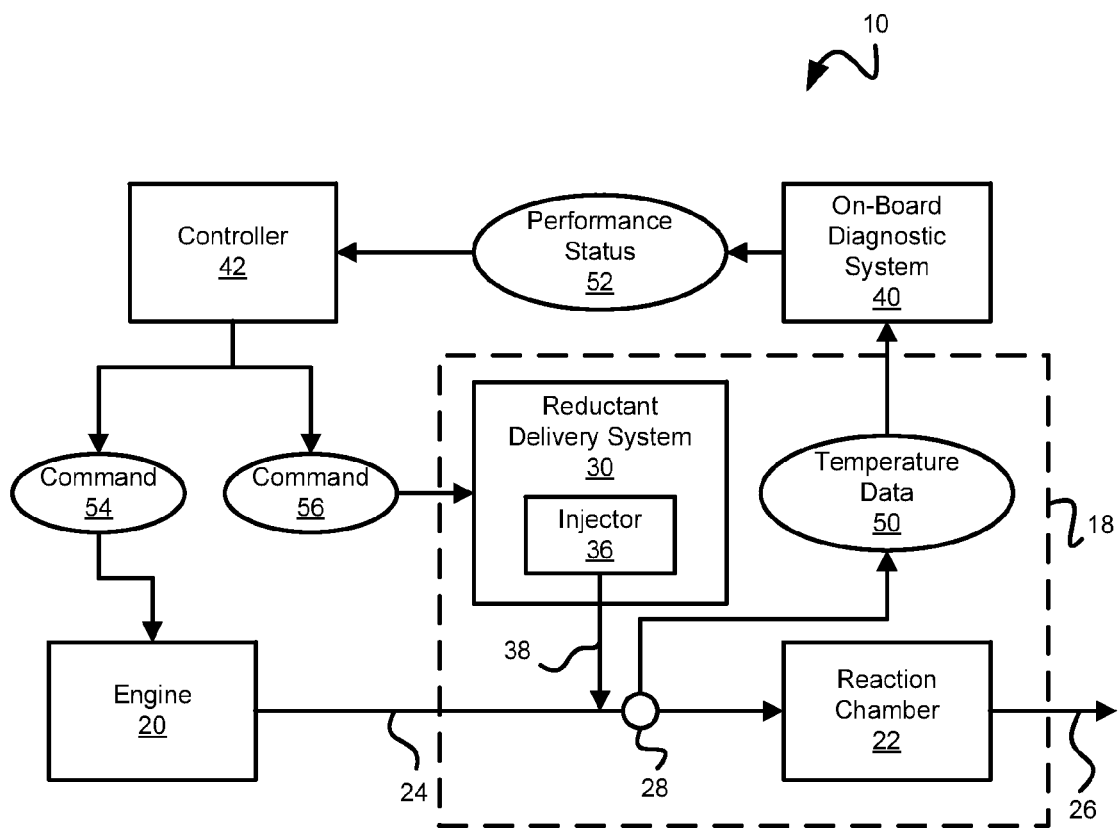
FIG. 1 is a schematic diagram of an internal combustion engine system having an internal combustion engine and a reductant delivery system in accordance with one representative embodiment.

FIG. 1 depicts one embodiment of an internal combustion engine system 10. The main components of the system 10 include an internal combustion engine 20 and an exhaust gas aftertreatment system, which may include a selective catalytic reduction (SCR) system 18. The SCR system 18 includes a reaction chamber 22 in which the catalytic process may occur. The reaction chamber 22 may be in exhaust gas receiving communication with the internal combustion engine 20 via an exhaust line 24. The reaction chamber 22 can include any of various catalysts, such as an SCR catalyst, configured to reduce nitrogen-oxides in the presence of ammonia, which can be obtained from the reduction of a reductant, such as aqueous urea.

The internal combustion engine 20 can be a compression-ignited internal combustion engine, such as a diesel fueled engine, or a spark-ignited internal combustion engine, such as a gasoline fueled engine operated lean. Combustion of the fuel and air in the compression chambers of the internal combustion engine 20 produces exhaust gas that is operatively vented to the exhaust line 24. From the exhaust line 24, at least a portion of the exhaust gas stream flows from into and through the exhaust gas aftertreatment system and SCR system 18 prior to being vented into the atmosphere through a tailpipe 26. A temperature sensor 28 may be positioned in or near the exhaust line 24.

Generally, the SCR system 18 may be configured to remove various chemical compounds and particulate emissions present in the exhaust gas received from the exhaust line 24. In addition to the reaction chamber 22, the SCR system 18 may include a reductant delivery system 30. Additionally or alternatively, the SCR system 18 may include any of various other exhaust treatment components known in the art, such as an oxidation catalyst, a particulate matter filter, and an ammonia oxidation catalyst. The reductant delivery system 30 may include a reductant source, which may take the form of a reductant tank, a reductant pump, and a doser, which operates as a reductant delivery mechanism and may take the form of an injector 36 that injects reductant 38 into the exhaust gas stream.

The reductant may be any substance known in the art that facilitates the breakdown, combination, and/or other conversion to inert form of pollutants in an exhaust gas stream. Thus, the reductant may include aqueous ammonia ($NH_3$), aqueous urea, diesel fuel, diesel exhaust fluid, and/or diesel oil. The injector 36 may be selectively controllable via actuation of a control valve to inject a desired amount of reductant 38 into the exhaust gas stream. The injector 36 may be positioned to inject reductant 38 into the exhaust line 24 upstream of the reaction chamber 22 and/or directly into the reaction chamber itself. As will be shown in FIG. 3, the temperature sensor 28 may be positioned proximate the injection site at which the reductant 38 enters the exhaust stream.

The internal combustion engine system 10 may also include an on-board diagnostic system (OBD) system 40 that receives information related to the operation of the system 10. The OBD system 40 may communicate with a controller 42 that controls operation of the system 10 and associated sub-systems, such as the internal combustion engine 20 and the reductant delivery system 30. The OBD system 40 and the controller 42 are each depicted in FIG. 1 as a single physical unit, but each may include two or more physically separated units or components in some embodiments if desired. Alternatively, the OBD system 40 and the controller 42 may be combined into a single unit that performs both diagnostic and control functions.

Generally, the OBD system 40 and the controller 42 may each receive multiple inputs, process the inputs, and transmit multiple outputs. In FIG. 1, only a few inputs and outputs are shown. More specifically, the OBD system 40 may receive temperature data 50 from the temperature sensor 28, and may use the temperature data 50 to determine a performance status 52 of the system 10. More specifically, the temperature data 50 may be used to determine whether there is a reductant deposit residing in the exhaust line 24 and/or the reaction chamber 22. The performance status 52 shown in FIG. 1 may be indicative of whether such a deposit is present. The performance status 52 may include a number indicative of the size or severity of the deposit, or may simply include a "yes" or "no" indicator indicating whether the deposit has reached a threshold size or severity. The OBD system 40 may issue other performance status data (not shown), which may include data regarding other operating characteristics of the system 10.

The controller 42 may receive the performance status 52 and/or other data and/based on the performance status 52 and other data, issue a command 54 to the internal combustion engine 20 and/or issue a command 56 to the reductant delivery system 30. The commands 54, 56 may direct the internal combustion engine 20 and/or the reductant delivery system 30 to take certain steps to optimize the operation of the system 10 (e.g., perform a regeneration of the exhaust aftertreatment system), shut down the system if a safety concern is present, or the like.

If desired, the OBD system 40 and/or the controller 42 may be designed to provide the performance status 52 and/or other data to a user, such as a driver of the vehicle containing the system 10. The performance status 52 may be provided, for example, via a light or LED, an auditory signal or alarm, an analog gauge, a digital readout, or the like. Moreover, the user may manually select and enter the command 54 and/or the command 56 based on the performance status 42 indicated to the user. Alternatively, the OBD system 40 and/or the controller 42 may operate substantially transparently to the user so that the commands are issued automatically.

Figure 2:
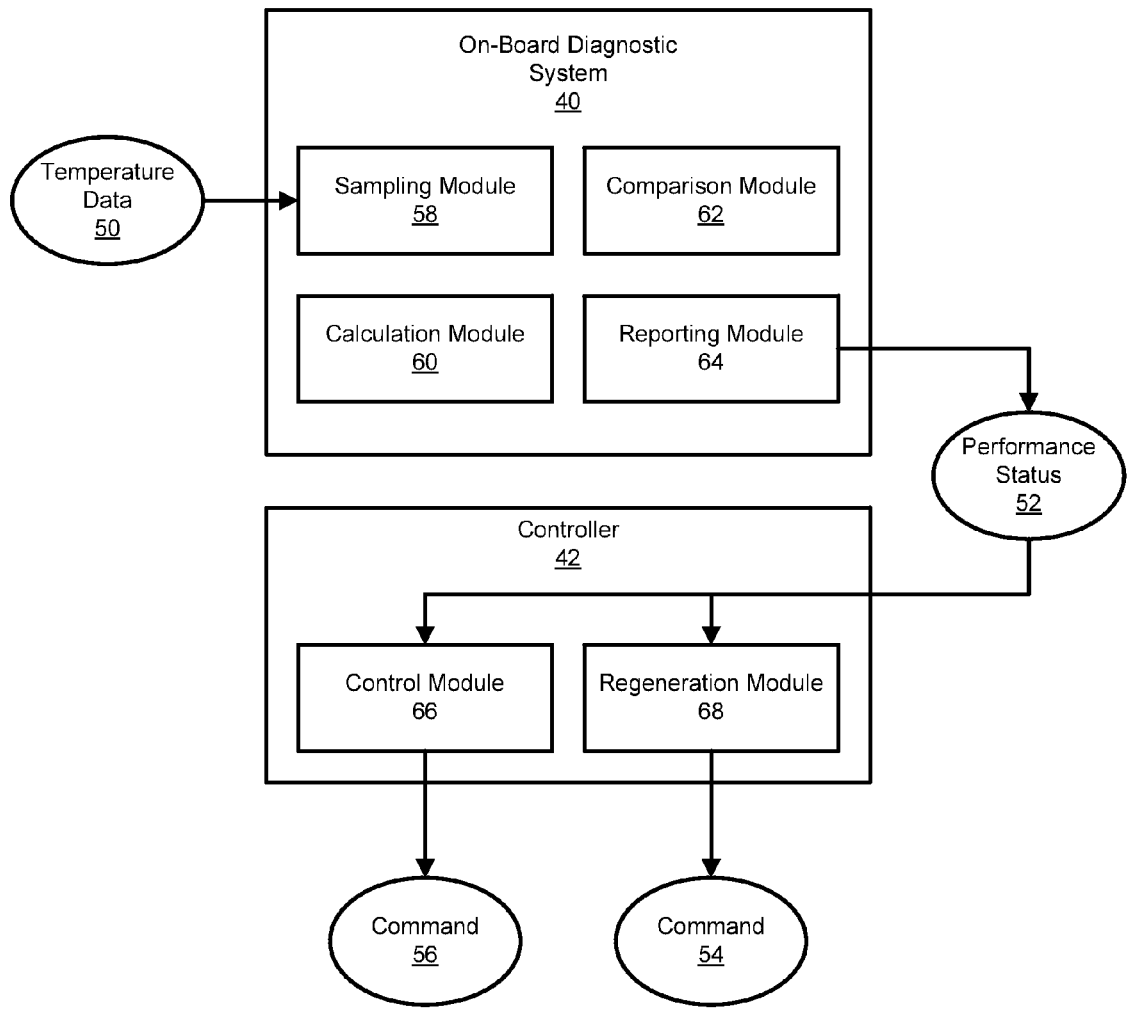
FIG. 2 is a schematic block diagram of the on-board diagnostic system and controller of the internal combustion engine system of FIG. 1 according to one embodiment.

Referring to FIG. 2, the OBD system 40 and the controller 42 may include various modules for diagnosing and controlling the operation of the system 10. As shown in FIG. 2, the OBD system 40 may include a sampling module 58, a calculation module 60, a comparison module 62, and a reporting module 64. The controller 42 may include a control module 66 and a regeneration module 68.

While not specifically illustrated and described with reference to FIG. 2, the OBD system 40 and/or the controller 42 may include additional controller modules for conducting other control system functions. The OBD system 40, the controller 42 and/or their various modular components may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices.

During normal operation of the reductant delivery system 30, the OBD system 40, or more specifically, the sampling module 58, may receive temperature data 50 from the temperature sensor 28. The sampling module 58 may receive other sensor data (not shown) from other sensors that provide data regarding the operation of the SCR system 18 such as, for example, pressure sensor data from the reductant delivery system 30, the exhaust line 24, and/or the reaction chamber 22, temperature data from other temperature sensors, flow meter data indicating the rate of flow of the reductant 38 into the exhaust stream, and/or data from other sensors as known in the art. However, one benefit of the present disclosure is that these sensors may not be required to properly diagnose whether a reductant deposit exists in the SCR system 18.

The calculation module 60 may use the temperature data 50 and/or other sensor data to calculate metrics useful in diagnosing the operation of the SCR system 18, such as temperature differentials occurring over time as the SCR system 18 operates. The comparison module 62 may compare the metrics provided by the calculation module 60 with other data, such as metrics obtained from previous operation of the SCR system 18, established thresholds, or the like. The reporting module 64 may, based on the output of the comparison module 62, provide the performance status 52 of the SCR system 18 to, for example, the controller 42. If desired, the performance status 52 may include a variety of data such as flow rates, pressures, temperatures, and other data reflecting the operating conditions of the SCR system 18.

In certain implementations, the OBD system 40 may accumulate or sum a plurality of errors, or deficiencies, related to exhaust temperature and/or other aspects of the operation of the SCR system 18 tracked by the OBD system 40, and compare the accumulated error data with at least one predetermined threshold. The predetermined threshold can be a regulated threshold or some other threshold associated with a system having an undesirable or unlawful amount of blockage. If the accumulated error data meets the threshold, then the reporting module 64 may issue a performance status 52 indicating failure of the SCR system 18 to meet operational or regulatory standards. However, if the accumulated error data does not meet the threshold, then the reporting module 64 may issues a performance status 52 indicating that the SCR system 18 "passes," e.g., the SCR system 18 meets and/or is likely to continue meeting applicable standards.

Alternatively, the performance status 52 may provide some other indication (e.g., "poor") of the performance of the SCR system 18 based on whether the accumulated error data meets the threshold. The comparison module 62 may compare the accumulated error data against multiple thresholds to provide a performance status 52 that indicates one of varying degrees of performance (e.g., "poor," "medium-poor," "medium," "medium-good," and "good"). In this manner, the OBD system 40 may report to a user the evolution (e.g., rate of decay) of the performance of the SCR system 18 over time such that a user can anticipate when the SCR system 18 may fail to meet the applicable standards.

In addition to, or in the alternative to, reporting the performance status 52 to the user, the reporting module 64 may provide the performance status 52 to the controller 42 so that the controller 42 can utilize the performance status 52 to automatically adjust the operation of the system 10. For example, the control module 66 may use the performance status 52 to issue the command 56 to the reductant delivery system 30 to speed up, slow down, or stop the flow of the reductant 38 into the exhaust line 24. The regeneration module 68 may use the performance status 52 to issue the command 54 to the internal combustion engine 20 to modify the operation of the internal combustion engine 20, for example, by initiating a regeneration cycle in which the internal combustion engine 20 produces exhaust at higher-than-average temperatures to burn away or otherwise remove reductant deposits within the exhaust line 24 and/or the reaction chamber 22.

Figure 3:
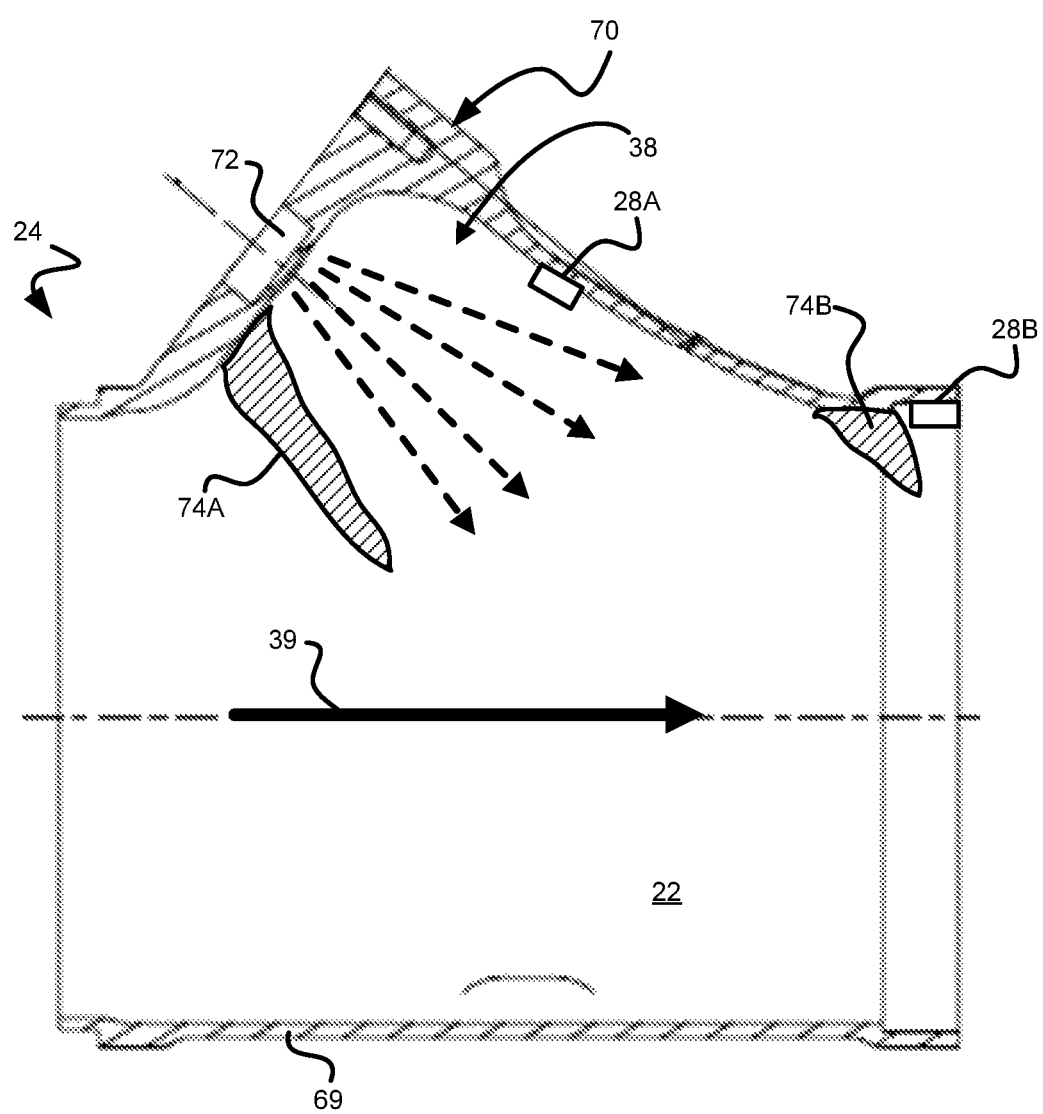
FIG. 3 is a cross-sectional side elevation view of a reductant doser boss and reaction chamber of an exhaust aftertreatment system according to one embodiment.

Referring to FIG. 3, a side elevation, section view illustrates the juncture of the exhaust line 24 with the reaction chamber 22, which may also be the part of the exhaust line 24 that receives the reductant 38 from the reductant delivery system 30. As shown, the exhaust line 24 may have an exterior wall 69 defining a generally tubular shape. The reaction chamber 22 may simply be a region of the generally tubular shape defined by the exterior wall 69 immediately downstream of the entry point of the reductant 38, in which reductant 38 is combined with exhaust 39 to define a mixture in which the catalytic reduction can occur.

As shown, the exhaust line 24 may have a boss 70 that extends at an angle from the exterior wall 69 of the exhaust line 24. The boss 70 may have an aperture 72 through which the reductant 38 is injected by the injector 36. Thus, the reductant 38 may spray into the exhaust stream as shown (e.g., from left to right in FIG. 3). The regions immediately downstream of the aperture 72 may receive reductant 38 that has not fully mixed with the exhaust stream yet, and may thus be particularly susceptible to the buildup of reductant deposits.

By way of example, a reductant deposit 74 is illustrated in FIG. 3. Such deposits need not be located as shown, but may be anywhere in the exhaust line 24, the reaction chamber 22, and/or the tailpipe 26 at or downstream of the entry point of the reductant 38. Additionally, the shape of the reductant deposit 74 is merely exemplary. Reductant deposits may take a variety of shapes, including stalactite shapes, conical shapes, asymmetrical lumps, etc. Such reductant deposits may develop on the interior wall of the exterior wall 69 or on any structure within the interior of the exhaust line 24, the reaction chamber 22, and/or the tailpipe 26, such as any filter positioned in any of these locations.

FIG. 3 also illustrates one example of placement of the temperature sensor 28. As shown, the temperature sensor 28 is within the trailing end of the boss 70, proximate the location where the trailing end of the boss 70 joins the exhaust line 24. It has been discovered that the formation of a reductant deposit like the reductant deposit 74 may cause a reduction in the temperature of the mixture of exhaust and reductant 38. This may be for a variety of reasons, including the fact that the reductant 38 is an insulator, and the flow patterns of exhaust and reductant 38 are altered by the physical presence of the reductant deposit 74.

Positioning the temperature sensor 28 at the location shown in FIG. 3 may provide the benefit of exposing the temperature sensor 28 to a relatively large temperature variation that occurs with development of the reductant deposit 74. Specifically, during normal operation of the SCR system 18, eddy currents in the mixture of exhaust gas and reductant 38 may develop within the boss 70. Such eddy currents may contain heated gases moving at a relatively high velocity that therefore transmit considerable heat to any structures within the exhaust line 24 and/or the exhaust line 24, and to the exterior wall 69. The presence of a reductant deposit such as the reductant deposit 74 may impede the flow of these eddy currents, thereby impeding the associated heat transfer to reduce the temperature of structures within the exhaust line 24 and/or the exhaust line 24, and of the exterior wall 69.

Thus, the location of the temperature sensor 28 shown in FIG. 3 may be beneficial because the temperature sensor 28 may be positioned within or near where these eddy currents normally develop. The temperature sensor 28 may, in its entirety, be positioned in the boss 70 as shown. Alternatively, the temperature sensor 28 may be inserted through a small opening (not shown) in the exterior wall 69 or the wall of the boss 70 so that the sensing portion of the temperature sensor 28 is positioned within the boss 70. The temperature sensor 28 may be any type of temperature sensor known in the art, including thermocouples, resistance temperature detectors (RTDs), thermistors, and the like.

The temperature sensor 28 may alternatively be positioned at a wide variety of locations, either within the boss 70, within the reaction chamber 22, or within the exhaust line 24 proximate or downstream of the boss 70. As another alternative, the temperature sensor 28 may be positioned outside the exhaust line 24, the reaction chamber 22, and/or the boss 70. At such a location, the temperature sensor 28 may effectively measure heat transfer through the exterior wall 69 and/or the wall of the boss 70. The speed at which heated gas flows through the exhaust line 24, the reaction chamber 22, and/or the boss 70 may control heat transfer through these structures, so positioning the temperature sensor 28 outside the flow of gas may provide sufficient data to determine whether a reductant deposit has formed.

Figure 4:
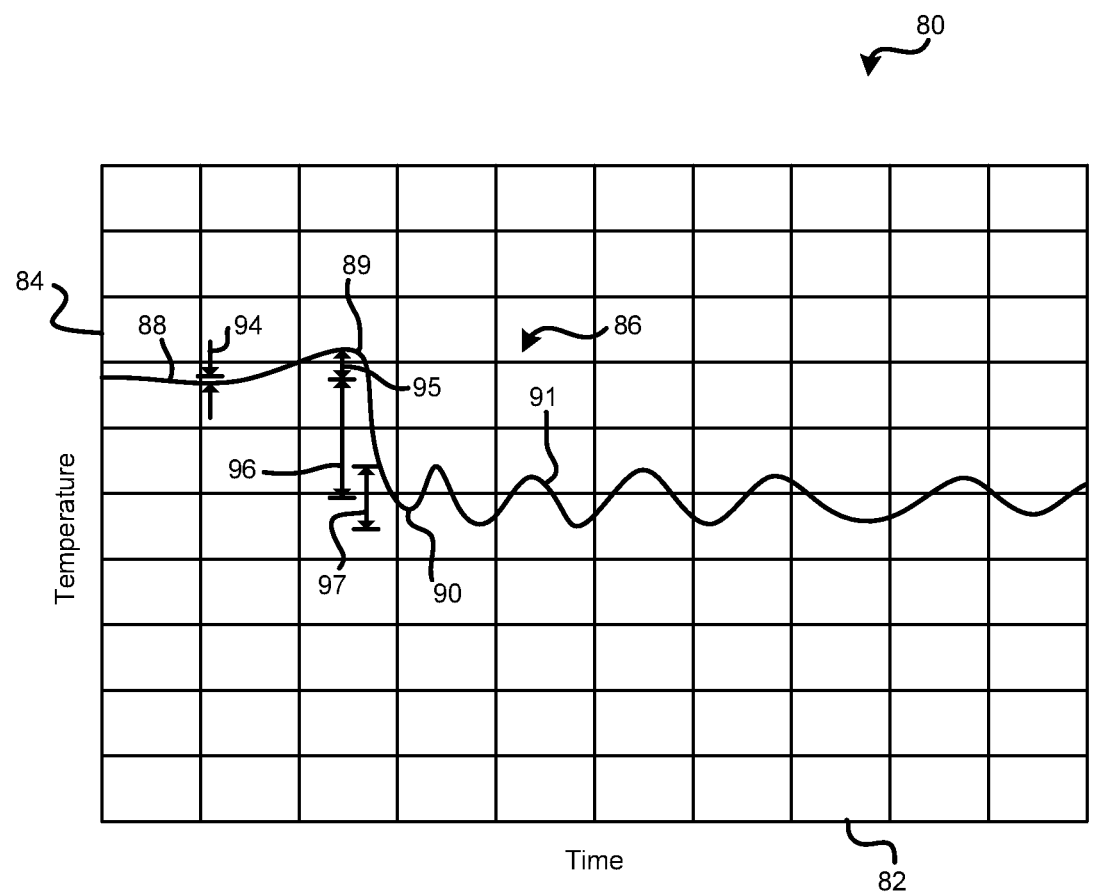
FIG. 4 is a chart illustrating how temperature data may change over time as a reductant deposit builds in an exhaust aftertreatment system according to one embodiment.

Referring to FIG. 4, a chart 80 illustrates how temperature data may change over time as a reductant deposit builds in the exhaust aftertreatment system such as the SCR system 18 of FIG. 1. The chart 80 has a horizontal axis 82 that indicates elapsed time, and a vertical axis 84 that indicates the temperature measured by a temperature sensor such as the temperature sensor 28. A temperature line 86 shows how the temperature may vary over time.

As shown, the temperature line 86 may have multiple regions including a normal temperature region 88, an increased temperature region 89, a decreased temperature region 90, and a low temperature region 91. The normal temperature region 88 may represent the performance of the SCR system 18 under generally normal conditions, i.e., without a significant reductant deposit.

As a reductant deposit like the reductant deposit 74 begins to form, it may cause a short-term increase in temperature as indicated by the increased temperature region 89. The brief increase in exhaust temperature may be caused by a temporary increase in the velocity of eddy currents within the boss 70 or other gas flow and/or heat transfer phenomena. As the reductant deposit grows, the temperature may drop for the reasons set forth in the discussion of FIG. 3, thus leading to the reduced temperature region 90 immediately after the temperature drop, and subsequently, the low temperature region 91 in which the temperature remains relatively low (with significant variation) until the reductant deposit is removed. The variation is caused by the continual evolution of the formation of the deposit (e.g., brief periods of incremental build-up between brief periods of incremental reduction).

The normal temperature region 88 may have a relatively stable temperature. This temperature may be on the order of 225° C. to 325° C. in some embodiments. The normal temperature region 88 may have a variation 94 between its maximum and minimum temperatures that is relatively low, for example, only a few degrees Centigrade. The temperature may then rise by a temperature increase 95 from the average temperature in the normal temperature region 88 to reach the maximum temperature of the increased temperature region 89.

Alternatively, the temperature may fall as it approaches the increased temperature region 89 so that the maximum temperature of the increased temperature region 89 is no higher than the average temperature in the normal temperature region 88. However, in this case, a discernible temperature increase may still exist during the early stages of deposit formation. The temperature increase may define an increased temperature region with a sharper increase than the increased temperature region 89 of FIG. 4 so as to define a temperature "spike."

After the increased temperature region 89, the temperature may fall back to the average temperature in the normal temperature region 88, and continue to fall by a temperature decrease 96 from the average temperature in the normal temperature region 88 to the average temperature in the low temperature region 91. The average temperature in the low temperature region 91 may be on the order of 100° C. to 200° C. in some embodiments. The low temperature region 91 may exhibit a variation 97 in temperature that is relatively large, for example, around 50° C. or even 100° C.

The chart 80 provides a number of different characteristics of the temperature that can be compared with established thresholds to diagnose the formation of a reductant deposit within the SCR system 18. Additionally, the OBD system 40 need not sample a continuous stream of temperature data; rather, sampling two temperature data points may be sufficient. For example, the OBD system 40 may simply compare a first temperature sampled from within the normal temperature region 88 with a second temperature sampled from within the low temperature region 91. If the temperature differential (i.e., the temperature drop) between the first and second temperatures exceeds a threshold temperature differential, the OBD system 40 may determine that a reductant deposit exists within the SCR system 18. This method will be shown and described in connection with FIG. 5.

Figure 5:
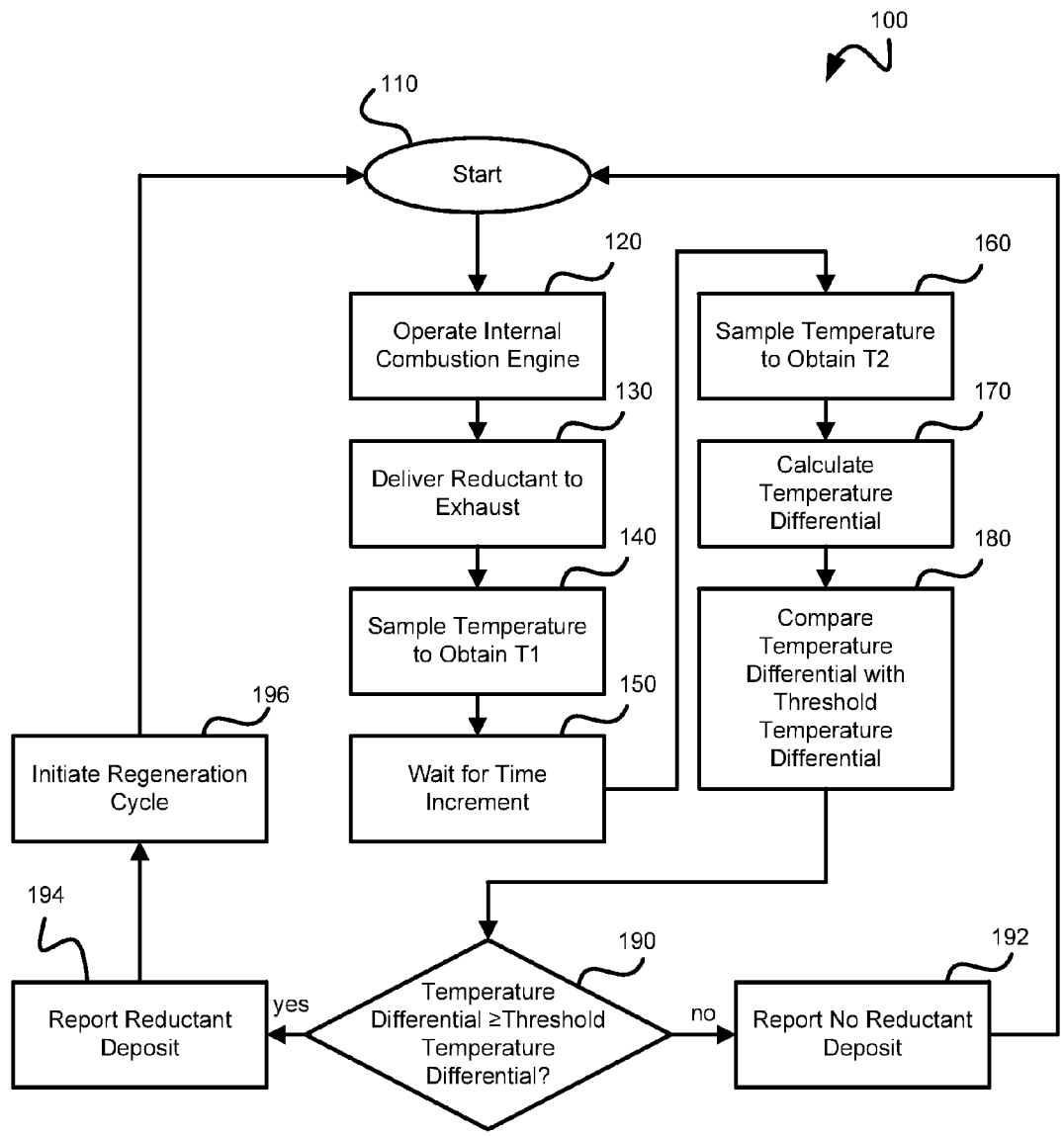
FIG. 5 is a flow chart diagram illustrating a method for diagnosing and/or responding to the existence of a reductant deposit in an exhaust aftertreatment system according to one embodiment.

Referring to FIG. 5, a flow chart diagram illustrates a method 100 for diagnosing and/or responding to the existence of a reductant deposit in the SCR system 18 of FIG. 1, according to one embodiment of the invention. The method 100 may operate continuously, or may be triggered by one or more events such as the passage of a certain time increment since the last time the method 100 was carried out, the previous detection of a reductant deposit, the previous initiation of a regeneration cycle, the presence of certain loading or operating conditions of the internal combustion engine 20, or other conditions involved in the operation of the system 10.

As shown, the method may start 110 with a step 120 in which the internal combustion engine 20 is operated to begin producing exhaust. In a step 130, the reductant 38 may be delivered to the exhaust stream. In a step 140, the sampling module 58 may be used to sample a first temperature of the mixture of exhaust and reductant from the temperature sensor 28. The first temperature may be sampled during the normal temperature region 88 of the temperature line 86. In a step 150, the OBD system 40 may wait for a given time increment such as, for example, the time required for the temperature to progress from the normal temperature region 88 of FIG. 4 to the decreased temperature region 90 or the low temperature region 91 of FIG. 4 if a reductant deposit is forming. However, if the temperature sampling is continuous, the step 150 may be omitted.

Once the desired time increment has passed, the sampling module 58 may sample a second temperature of the mixture of exhaust and reductant from the temperature sensor 28. The second temperature may be sampled during the low temperature region 91 of the temperature line 86. Then, in a step 170, the calculation module 60 may calculate the temperature differential between the first and second temperatures sampled in the step 140 and the step 160. This may be accomplished by subtracting the first temperature from the second temperature. Then, in a step 180, the comparison module 62 may compare the temperature differential with a threshold temperature differential.

In a query 190, if the temperature differential does not exceed the threshold temperature differential, the method 100 may progress to a step 192 in which the reporting module 64 generates the performance status 52 indicating that there is no significant reductant deposit. The method 100 may then restart, either immediately or after a desired time increment has passed.

If the temperature differential does exceed the threshold temperature differential, the method 100 may progress to a step 194 in which the reporting module 64 generates the performance status 52 indicating that a significant reductant deposit does exist. If desired, in a step 196, a regeneration cycle may then be initiated to automatically regenerate the SCR system 18 to clear the reductant deposit.

According to one example, regeneration may be accomplished by transmitting the performance status 52 to the controller 42 so that the controller 42 can automatically initiate the desired remedial measures. The control module 66 may issue the command 56 to the reductant delivery system 30 to alter the operation of the reductant delivery system 30 to facilitate removal of the reductant deposit, for example, by stopping the flow of the reductant 38 through the injector 36. The regeneration module 68 may similarly issue the command 54 to the internal combustion engine 20 to alter the operation of the internal combustion engine 20 to further help remove the reductant deposit. For example, the command 54 may cause the internal combustion engine 20 to run at a higher temperature, thereby increasing the temperature of the exhaust stream flowing through the exhaust line 24 to a temperature that breaks down, burns, and/or otherwise removes the reductant deposit.

After the regeneration cycle has been completed, the method 100 may then restart, either immediately or after a desired time increment has passed. It may be desirable to restart the method 100 immediately after completion of the step 196 to ensure that the reductant deposit has been successfully removed. Alternatively, a modified method may be used after the performance of the step 196. For example, only a single temperature (e.g., a third temperature) may need to be sampled. The third temperature may be compared with the first temperature and/or the second temperature to rapidly determine whether the SCR system 18 has returned to normal operating conditions.

In the alternative to the foregoing method, the OBD system 40 may use different methods to diagnose the existence of a reductant deposit. For example, the OBD system 40 may instead calculate the temperature differential between a first temperature within the normal temperature region 88 and a second temperature within the increased temperature region 89. The resulting temperature differential may then be a temperature rise. In other alternatives, the OBD system 40 may calculate the temperature differential between a first temperature within the normal temperature region 88 or within the increased temperature region 89 and a second temperature within the decreased temperature region 90. Again, the temperature differential may be a temperature drop.

In any of the foregoing cases, the elapsed time between measurement of the first and second temperatures may be determined from observation of experimental data, i.e., how long the SCR system 18 takes, during formation of a reductant deposit, to go from the normal temperature region 88 to the increased temperature region 89, the decreased temperature region 90, or the low temperature region 91, or from the increased temperature region 89 to the decreased temperature region 90 or low temperature region 91, etc. A simple comparison of two temperature data points can be made as set forth above or, if desired, additional temperature data points may be collected and analyzed to provide a more complete and/or reliable diagnosis.

In the alternative to looking for a temperature drop or a temperature rise, the OBD system 40 may instead look for a change in other characteristics of the temperature data. In one embodiment, the OBD system 40 analyzes the temperature data to look for the amplitude of variations in the temperature over time. For example, the OBD system 40 may sample temperature data and, based on a standard deviation or other measurement of variation of the data, determine whether a reductant deposit exists. If the variation in temperature data is like the variation 94 in FIG. 4, the OBD system 40 may conclude that there is no significant reductant deposit in the SCR system 18. Conversely, if the variation in temperature data is like the variation 97 in FIG. 4, the OBD system 40 may conclude that a reductant deposit exists in the SCR system 18.

If the OBD system 40 is measuring temperature amplitude instead of a temperature drop or temperature rise, the calculation module 60 may determine an absolute value of the difference between the first and second temperatures. The comparison module 62 may then compare this absolute value to a threshold temperature differential that acts as a threshold amplitude. If the absolute value of the difference is greater than the threshold amplitude, the reporting module 64 may issue the performance status 52 indicating that there is a reductant deposit. If the absolute value of the difference is not greater than the threshold amplitude, the reporting module 64 may issue the performance status 52 indicating that there is no reductant deposit.

As another alternative to the method 100 of FIG. 5, a different OBD system (not shown) may only sample a single temperature from a single temperature sensor like the temperature sensor 28. If the single temperature is, for example, below a given temperature threshold, the OBD system may then determine that a reductant deposit has formed. For example, if the steady-state temperature of the exhaust aftertreatment system is 225° C. to 325° C., the OBD system may determine that the reductant deposit exists if the temperature reading is below 225° C. Other temperatures may, of course, be used for the threshold, such as 125° C., 150° C., 175° C., or 200° C.

As yet another alternative, a different OBD system (not shown) may only sample a single temperature from a single temperature sensor like the temperature sensor 28. If the single temperature is, for example, above a given temperature threshold, the OBD system may then determine that a reductant deposit has formed. For example, if the steady-state temperature of the exhaust aftertreatment system is 225° C. to 325° C., the OBD system may determine that the reductant deposit exists if the temperature reading is greater than 325° C. Other temperatures may, of course, be used for the threshold, such as 350° C. or 375° C. Such a method makes use of the temperature "spike" that may be observed upon initial formation of the reductant deposit.

The chart 80 is merely exemplary and represents how the data from one location of the temperature sensor 28 might appear. The manner in which the temperature responds to reductant deposit formation will be different for each temperature sensor location. Similarly, the manner in which the deposit formation is diagnosed by the OBD system 40 may be different from the methods set forth above. A wide variety of temperature phenomena may occur over time with different sensor placements; the present invention contemplates all methods utilizing any such phenomena to diagnose the existence of a reductant deposit in an exhaust aftertreatment system.

If desired, multiple temperature sensors (not shown) may be used to provide multiple sources of temperature data for more accurate diagnosis. If multiple sensors are used, the comparison module 62 may be used to compare data from multiple sensors, in place of or in addition to the comparison of data from a single sensor taken at different points in time. For example, in addition to the temperature sensor 28, an additional temperature sensor may be placed upstream of the boss 70, and the temperature drop from the upstream sensor to the temperature sensor 28 may be calculated and compared with pre-existing thresholds to determine whether an obstruction such as the reductant deposit 74 is producing a larger-than-expected temperature drop.

As another alternative, other types of sensors may be used in combination with the temperature sensor 28. For example, one or more pressure sensors may be positioned in the exhaust line 24, the reaction chamber 22, and/or the boss 70 to measure the pressure drop occurring within one or more of these components. Such information may help to determine whether the temperature data 50 truly indicates the presence of a reductant deposit, or are indicative of a different anomaly within the SCR system 18. For example, the temperature of the mixture of exhaust and reductant 38 may also be affected by the pressure of the mixture, which may in turn be affected by factors such as the dosing rate of the reductant 38 and the loading of the internal combustion engine 20. Thus, the comparison module 62 may reference not just one threshold temperature differential, but may have an array of threshold temperature differentials that apply to different operating conditions of the system 10 and/or to different pressures of the mixture of exhaust and reductant 38.

According to one example, each range of pressure drops within the exhaust line 24 may have a different threshold temperature differential that applies to it. Thus, the sampling module 58 may sample pressure data (not shown) in addition to the temperature data 50. The calculation module 60 may calculate a pressure drop, or "pressure differential" in addition to the temperature differential. The comparison module 62 may then reference an array of pressure differential ranges to find the range within which the measured pressure differential falls, and then locate the applicable threshold temperature differential. This threshold temperature differential may then be used by the comparison module 62 to determine whether a reductant deposit is present within the SCR system 18.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing.

In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for diagnosing existence of a reductant deposit in an exhaust aftertreatment system that delivers reductant to exhaust gas produced by an internal combustion engine to provide a mixture of exhaust gas and reductant, the method comprising:
   sampling a temperature of the mixture of exhaust gas and reductant with a temperature sensor positioned in or near the exhaust aftertreatment system;
   determining the temperature exceeds a predetermined temperature value;
   determining a presence of a reductant deposit in the exhaust aftertreatment system responsive to determining the temperature exceeds the predetermined temperature value; and
   initiating a regeneration cycle of the internal combustion engine to increase a temperature of the exhaust gas flowing through the exhaust aftertreatment system to at least partially remove the reductant deposit responsive to determining the presence of the reductant deposit.

2. The method of claim 1, further comprising, before sampling the temperature of the mixture of exhaust gas and reductant, positioning the temperature sensor in or near the exhaust aftertreatment system.

3. The method of claim 1, wherein the predetermined temperature value is a value corresponding to a temperature spike indicative of increased heat transfer due to the reductant deposit.

4. The method of claim 1, wherein the temperature sensor is positioned near a boss that extends from a decomposition chamber of the exhaust aftertreatment system, a reductant delivery system of the exhaust aftertreatment system delivering reductant to the exhaust gas through the boss.

5. The method of claim 1, wherein the predetermined temperature value is greater than a value for a normal temperature region.

6. An on-board diagnostic apparatus for diagnosing an existence of a reductant deposit in an exhaust aftertreatment system, the apparatus comprising:
   a sampling circuit configured to sample a temperature of a mixture of exhaust gas and reductant with a temperature sensor;
   a comparison circuit configured to:
      determine the temperature exceeds a predetermined temperature value, and
      determine a presence of a reductant deposit in an exhaust aftertreatment system responsive to determining the temperature exceeds the predetermined temperature value; and
   a regeneration circuit configured to initiate a regeneration cycle of an internal combustion engine to increase a temperature of exhaust gas flowing through the exhaust aftertreatment system to at least partially remove the reductant deposit responsive to determining the presence of the reductant deposit.

7. The apparatus of claim 6, wherein the predetermined temperature value is a value corresponding to a temperature spike indicative of increased heat transfer due to the reductant deposit.

8. The apparatus of claim 6, wherein the temperature sensor is positioned near a boss that extends from a decomposition chamber of the exhaust aftertreatment system, a reductant delivery system of the exhaust aftertreatment system delivering reductant to the exhaust gas through the boss.

9. The apparatus of claim 6, wherein the predetermined temperature value is greater than a value for a normal temperature region.

10. A system comprising:

an internal combustion engine;

an exhaust aftertreatment system in fluid communication with the internal combustion engine to receive exhaust gas from the internal combustion engine, the exhaust aftertreatment system injecting reductant into the exhaust gas to create a mixture of exhaust gas and reductant, a temperature sensor positioned in or near the exhaust aftertreatment system; and an onboard diagnostic system including:

a sampling circuit configured to sample a first temperature of a mixture of exhaust gas and reductant with the temperature sensor;

a comparison circuit configured to:

determine the temperature exceeds a predetermined temperature value, and determine a presence of a reductant deposit in the exhaust aftertreatment system responsive to determining the temperature exceeds the predetermined temperature value; and a regeneration circuit configured to initiate a regeneration cycle of the internal combustion engine to increase a temperature of exhaust gas flowing through the exhaust aftertreatment system to at least partially remove the reductant deposit responsive to determining the temperature exceeds the predetermined temperature value indicative of a presence of a reductant deposit.

11. The system of claim 10, wherein the predetermined temperature value is a value corresponding to a temperature spike indicative of increased heat transfer due to the reductant deposit.

12. The system of claim 11, wherein the temperature sensor is positioned near a boss that extends from a decomposition chamber of the exhaust aftertreatment system, a reductant delivery system of the exhaust aftertreatment system delivering reductant to the exhaust gas through the boss.

13. The system of claim 10, wherein the predetermined temperature value is greater than a value for a normal temperature region.

* * * * *